United States Patent
Yamada et al.

(10) Patent No.: US 6,358,869 B1
(45) Date of Patent: Mar. 19, 2002

(54) LI$_2$O-AL$_2$O$_3$-SIO$_2$ TYPE TRANSPARENT CRYSTALLIZED GLASS

(75) Inventors: Hiroyuki Yamada, Kusatsu; Akihiko Sakamoto, Koka-gun, both of (JP)

(73) Assignee: Nippon Electric Glass Co., Ltd., Otsu (JP)

(*) Notice: Subject to any disclaimer, the term of this patent is extended or adjusted under 35 U.S.C. 154(b) by 0 days.

(21) Appl. No.: 09/485,946

(22) PCT Filed: Jun. 17, 1999

(86) PCT No.: PCT/JP99/03230

§ 371 Date: Feb. 17, 2000

§ 102(e) Date: Feb. 17, 2000

(87) PCT Pub. No.: WO99/65837

PCT Pub. Date: Dec. 23, 1999

(30) Foreign Application Priority Data

Jun. 19, 1998 (JP) .......................................... 10-189648

(51) Int. Cl.$^7$ .......................... C03C 10/12; C03C 21/00
(52) U.S. Cl. ................................................. 501/4; 501/7
(58) Field of Search ........................................ 501/4, 7

(56) References Cited

U.S. PATENT DOCUMENTS

| | | | | |
|---|---|---|---|---|
| 4,126,476 A | * | 11/1978 | Grossman | 501/4 |
| 4,438,210 A | * | 3/1984 | Rittler | 501/4 |
| 4,455,160 A | * | 6/1984 | Rittler | 65/30.13 |
| 4,461,839 A | * | 7/1984 | Rittler | 501/4 |
| 4,726,981 A | * | 2/1988 | Pierson et al. | 501/4 |
| 4,755,488 A | * | 7/1988 | Nagashima | 501/4 |
| 5,691,256 A | * | 11/1997 | Taguchi et al. | 501/7 |
| 5,874,376 A | * | 2/1999 | Taguchi et al. | 504/7 |

FOREIGN PATENT DOCUMENTS

| | | |
|---|---|---|
| JP | 59-116150 | 7/1984 |
| JP | 5-70174 | 3/1993 |
| JP | 8-104539 | 4/1996 |

* cited by examiner

*Primary Examiner*—Karl Group
(74) *Attorney, Agent, or Firm*—Collard & Roe, P.C.

(57) ABSTRACT

In an Li$_2$O—Al$_2$O$_3$—SiO$_2$ transparent crystallized glass with β-quartz solid solution precipitated as main crystals, the Li$^+$ concentration ratio an at a position of 50 nm from the surface of the glass is equal to 0.80 or less where the Li$^+$ concentration at a position of 2000 nm from the surface is supposed to be equal to 1.

3 Claims, 1 Drawing Sheet

$Li_2O$-$Al_2O_3$-$SiO_2$ TYPE TRANSPARENT CRYSTALLIZED GLASS

TECHNICAL FIELD

This invention relates to a transparent crystallized glass for use in a front window or an inspection window of a combustion apparatus for burning oil, coal, gas, wood, or the like, i.e., a room heater, a heating furnace, an annealing furnace, and so on.

BACKGROUND ART

A front window of a room heater or the like serves to enhance a room-heating effect by transmitting heat radiation emitted from a flame inside the heater to the outside and to visually increase warm feeling by allowing the flame to be visible. An inspection window serves to allow a burning condition of the flame to be observed from the outside. These windows must be resistant against a high temperature produced from the flame and heat shock at the ignition. Therefore, a material used in the windows of such combustion apparatus is required to be transparent and to be low in thermal expansion and high in mechanical strength so that the heat resistance and the heat-shock resistance are excellent.

At present, use is made of a borosilicate glass, a silica glass, and an $Li_2O$—$Al_2O_3$—$SiO_2$ transparent crystallized glass in the windows of the room heater and the like. However, the borosilicate glass is not sufficient in heat resistance and heat-shock resistance. The silica glass is excellent In thermal characteristics but is expensive. On the other hand, the $Li_2O$—$Al_2O_3$—$SiO_2$ transparent crystallized glass is excellent in heat resistance and heat-shock resistance because the coefficient of thermal expansion is small and the mechanical strength is high, and can be produced at a relatively low cost. Therefore, this glass is widely used.

However, the $Li_2O$—$Al_2O_3$—$SiO_2$ transparent crystallized glass is disadvantageous in that, when It is placed in a combustion atmosphere, an inner surface or a burning-side surface of the window is subjected to chemical corrosion to produce microcracks which result in considerable decrease in transparency and mechanical strength.

The reason why the above-mentioned disadvantage is caused is as follows. In the combustion atmosphere of the combustion apparatus for burning oil, coal, gas, wood, or the like, $SO_x$ produced from sulfur contained in such fuel is present and reacts with $H_2O$ produced by combustion to produce $H_2SO_4$. $H^+$ions produced from $H_2SO_4$ cause an ion exchange reaction with $Li^+$ ions in the $Li_2O$—$Al_2O_3$—$SiO_2$ transparent crystallized glass to shrink the volume of crystals, resulting in occurrence of the cracks.

In order to avoid the above-mentioned disadvantage, use is made of a technique of forming a coating film such as $SiO_2$ on the surface of the $Li_2O$—$Al_2O_3$—$SiO_2$ transparent crystallized glass. However, this technique is unfavorable because the production cost is increased. Alternatively, it is possible to suppress the occurrence of the ion exchange reaction with the $H^+$ ions by reducing the content of the $Li^+$ ions in the $Li_2O$—$Al_2O_3$—$SiO_2$ transparent crystallized glass. However, there arises a problem that the transparency is deteriorated and the coefficient of thermal expansion is increased.

It is therefore an object of this invention to provide an $Li_2O$—$Al_2O_3$—$SiO_2$ transparent crystallized glass which will not produce microcracks even if it is exposed to a $H_2SO_4$containing atmosphere produced by a fuel such as oil, coal, gas, wood, or the like for a long time.

DISCLOSURE OF THE INVENTION

As a result of various experiments, the present inventors have found that, by reducing the $Li^+$ concentration on the surface of a crystallized glass as compared with the inside, the occurrence of microcracks resulting from an ion exchange reaction with $H^+$ ions can effectively be suppressed, and herein propose this invention.

Specifically, an $Li_2O$—$Al_2O_3$—$SiO_2$ transparent crystallized glass according to this invention comprises $Li_2O$, $Al_2O_3$, and $SiO_2$ with β-quartz solid solution precipitated as main crystals and is characterized in that the $Li^+$ concentration ratio at a position of 50 nm from the surface of the $Li_2O$—$Al_2O_3$—$SiO_2$ transparent crystallized glass is equal to 0.80 or less where the $Li^+$ concentration at a position of 2000 nm from the surface is supposed to be equal to 1.

BEST MODE FOR EMBODYING THE INVENTION

Figure 1:
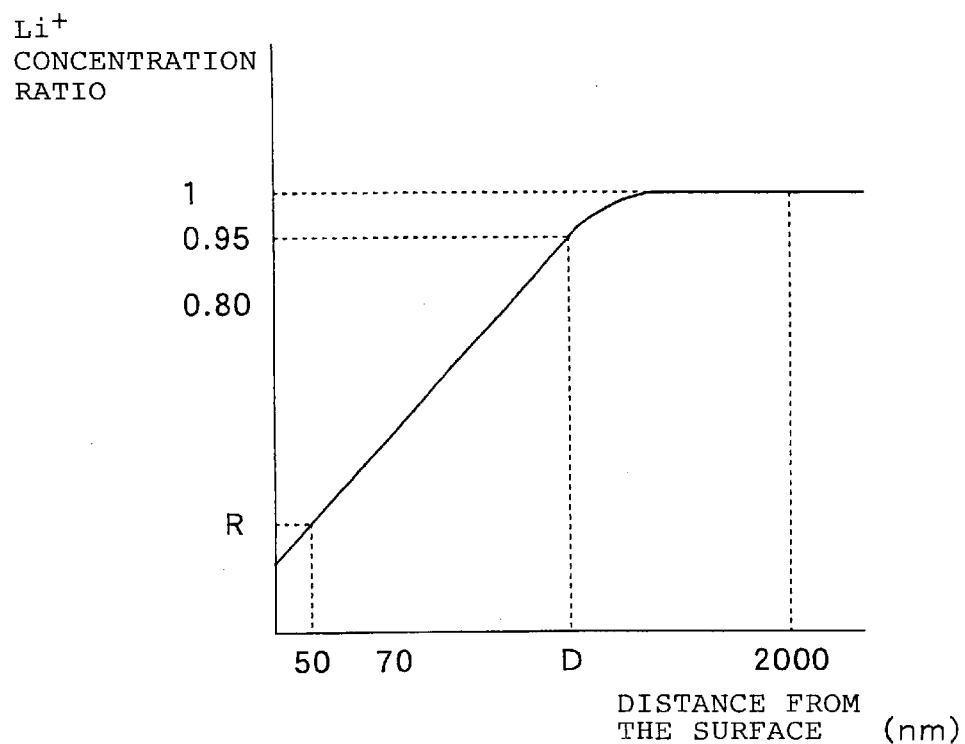
FIG. 1 is a graph schematically showing the distribution of $Li^+$ concentration in an $Li_2O$—$Al_2O_3$13 $SiO_2$ transparent crystallized glass according to this invention.

Referring to FIG. 1, in an $Li_2O$—$Al_2O_3$—$SiO_2$ transparent crystallized glass according to this invention, the $Li^+$ concentration ratio (R) at a position of 50 nm from the surface thereof is equal to 0.80 or less, preferably 0.70 or less where the $Li^+$ concentration at a position of 2000 nm from the surface is supposed to be equal to 1. If the $Li^+$ concentration at the surface is low, the crystal amount of β-quartz solid solution precipitated as main crystals is reduced so that $Li^+$ ions contained in the crystals are reduced in amount. Therefore, even if $H_2SO_4$ is contained in a combustion atmosphere, an ion exchange lessens to occur so that the occurrence of microcracks is suppressed.

On the other hand, if the $Li^+$ concentration ratio at the depth of 50 nm exceeds 0.80, the above-mentioned effect becomes extremely small so that the occurrence of microcracks can not be prevented.

As described above, the effect of suppressing the occurrence of microcracks is greater as the $Li^+$ concentration in the vicinity of the surface is lower. Furthermore, as a portion in which the $Li^+$ concentration is low is thicker, the effect is much greater. Specifically, it is desired that the distance (D) between the surface and a position at which the $Li^+$ concentration ratio reaches 0.95 is 70 nm or more, preferably, 100 nm or more where the $Li^+$ concentration at a position of 2000 nm from the surface is supposed to be equal to 1. As the above-mentioned distance is greater, the amount of $Li^+$ ions on the surface is smaller and the crystal amount of precipitated 6 -quartz solid solution is smaller so that the microcracks are more hardly produced. If the distance is smaller than 70nm, the effect of suppressing the occurrence of microcracks is insufficient.

The crystallized glass of this invention may contain various components other than $Li_2O$, $SiO_2$, and $Al_2O_3$. For example, the crystallized glass may contain $Na_2O$, $K_2O$, MgO, ZnO, BaO, or the like as a component for promoting melting and controlling the coefficient of thermal expansion, $TiO_2$, $ZrO_2$, or the like as a nucleating agent, $P_2O_5$ as a component for promoting nucleation, and $As_2O_3$, $Sb_2O_3$, $SnO_2$, Cl, $SO_3$, or the like as a fining agent. Specifically, it is preferable that the crystallized glass consists essentially of, by weight percent, 55–75% $SiO_2$, 15–30% $Al_2O_3$, 2–4.8% $Li_2O$, 0–1% $Na_2O$, 0–1% $K_2O$, 0–5% MgO, 0–2% ZnO, 0–3.5% BaO, 0.1–5% $TiO_2$, 0–4% $ZrO_2$, 0–5% $P_2O_5$, 0–2.5% $As_2O_3$, 0–2.5% $Sb_2O_3$, and 0–2.5% $SnO_2$. In case where $Na_2O$ and/or $K_2O$ is contained, it is desired that the $Na^+$ concentration ratio at a position of 50 nm from the surface is equal to 2.0 or more, preferably, 2.2 or more and the $K^+$ concentration ratio at a position of 50 nm from the surface is equal to 1.5 or more, preferably, 2.0 or more where each of the $Na^+$ concentration and the $K^+$ concentration at a position of 2000 nm from the surface is supposed to be equal to 1. Specifically, if the $Na^+$ concentration and/or the $K^+$ concentration is greater than the above-mentioned ratio, the $Li^+$ concentration at the surface is lowered and the crystal amount at the surface is reduced so that the occurrence of microcracks is easily suppressed.

In this invention, each of the $Li^+$ concentration, the $Na^+$ concentration, and the $K^+$ concentration can be controlled to achieve desired distribution of concentration by the use of various methods such as a method of adjusting crystallizing conditions and a method of subjecting an uncrystallized green glass to an ion exchange. In either method, it is important to select an appropriate processing condition for each glass composition because an optimum condition is different depending upon the composition.

Hereinafter, description will be made about specific examples of this invention.

Table 1 shows examples (Samples Nos. 1–3) of this invention and a comparative example (Sample No. 4).

Figure 2:
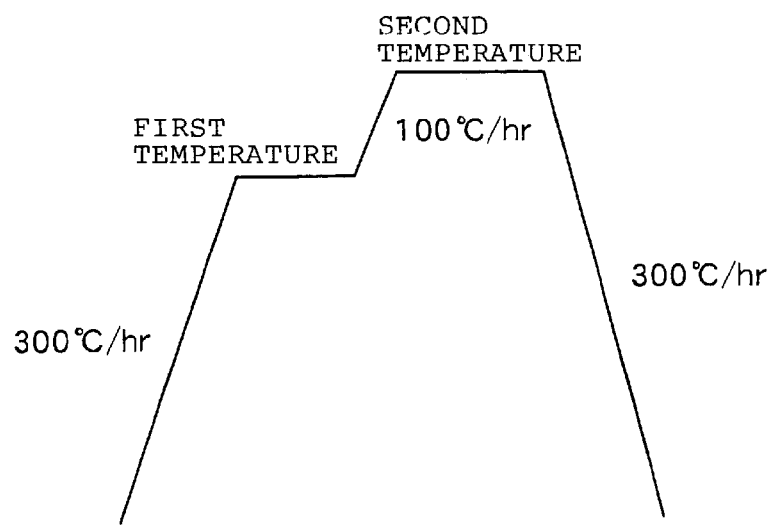
FIG. 2 is a graph showing a firing schedule.

Each sample was prepared as follows. At first, an $Li_2$—$Al_2O_3$—$SiO_2$ glass consisting of 65.5% $SiO_2$, 22.1% $Al_2O_3$, 4.2% $Li_2O$, 0.5% $Na_2O$, 0.3% $K_2O$, 0.5% MgO, 1.9% $TiO_2$, 2.3% $ZrO_2$, 1.4% $P_2O_5$, and 1.3% $As_2O_3$ was obtained by melting and forming. Thereafter, the glass was fired in an electric furnace under the condition shown in Table 1 to be crystallized. Thus, the sample was obtained. The firing was carried out in the schedule shown in FIG. 2, in which the glass was held at a first temperature for two hours and at a second temperature for one hour. Each of the $Li^+$, $Na^+$, and $K^+$ concentration ratios (concentration at 50 nm /concentration at 2000 nm) and the thickness of a surface portion (distance from the surface to a position at which the $Li^+$ concentration ratio reaches 0.95) was obtained from the distribution of concentration of each component measured by SIMS (Secondary Ion Mass Spectroscopy). The identification of precipitated crystal was carried out by X-ray diffraction. Herein, "β-Q." in Table 1 represents precipitated β-quartz solid solution.

TABLE 1

| Sample No. | 1 | 2 | 3 | 4 |
|---|---|---|---|---|
| Firing Condition | | | | |
| First Temperature (° C.) | 770 | 780 | 800 | 720 |
| Second Temperature (° C.) | 850 | 840 | 830 | 890 |
| $Li^+$ Concentration Ratio | 0.65 | 0.45 | 0.28 | 0.85 |
| $Na^+$ Concentration Ratio | 3.05 | 3.65 | 4.80 | 1.02 |
| $K^+$ Concentration Ratio | 3.80 | 4.60 | 5.50 | 1.00 |
| Thickness of Surface Portion (nm) | 250 | 320 | 350 | 60 |
| Main Crystal | β-Q. | β-Q. | β-Q. | β-Q. |
| Microcrack Resistance | | | | |
| Accelerated Test | absent | absent | absent | present |
| Mounted Test (days) | >50 | >50 | >50 | 7 |

As shown in Table 1, the main crystal in each sample was precipitated β-quarts solid solution.

In each of the samples Nos. 1–3, the $Li^+$ concentration ratio was 0.28–0.65, the $Na^+$ concentration ratio was 3.05–4.80, the $K^+$ concentration ratio was 3.80–5.50, the distance from the surface to a position at which the $Li^+$ concentration ratio reaches 0.95 was 250–350 nm.

On the other hand, in the sample No. 4, the $Li^+$ Concentration ratio was 0.85, the $Na^+$ concentration ratio was 1.02, the $K^+$ concentration ratio was 1.00, the distance from the surface thereof to a position at which the $Li^+$ concentration ratio reaches 0.95 was 60 nm.

Next, each sample was evaluated for the microcrack resistance. The microcrack resistance was evaluated by two kinds of methods including an accelerated test and a mounted test in a combustion apparatus.

The accelerated test was carried out as follows. At first, 20 ml of sulfuric acid water solution having a concentration of 6 vol % was poured into a beaker having a volume of 1l. Subsequently, a net was arranged in the beaker and the sample was put on the net to be exposed to vapor of sulfuric acid. Thereafter, the beaker was untightly closed by a glass plate. Then, after heating at 320° C. for 30 minutes, the sample was taken out and the surface thereof was observed by a microscope. In Table 1, the sample is labelled "absent" and represents if the cracks were not observed and observed, respectively.

In the mounted test, each sample of the crystallized glass was attached to a front surface of a stove using light oil containing sulfur as a fuel. Burning was continuously carried out in an ordinary condition until microcracks were visually observed. In terms of the number of days which have lapsed, evaluation was carried out.

As a result, each of the samples Nos. 1–3 as the examples of this invention did not produce the cracks in the accelerated test. In the mounted test, the occurrence of microcracks was not observed for more than 50 days. Thus, the microcrack resistance was good.

On the other hand, the sample No. 4 as the comparative example was revealed to be far inferior in both of the accelerated test and the mounted test than each sample as the example of the invention and to be poor in microcrack resistance.

From the above-mentioned facts, it is shown that the crystallized glass according to this invention is excellent in microcrack resistance.

As described above, the $Li_2O$—$Al_2O_3$—$SiO_2$ transparent crystallized glass of this invention does not produce microcracks even if it is exposed for a long period of time to the atmosphere containing $H_2SO_4$ produced by the fuel such as oil, coal, gas, and wood. Therefore, the crystallized glass is very effective as a material of a front window or an inspection window of a combustion apparatus such as a room heater, a heating furnace, and an annealing furnace.

Industrial Applicability

As described above, the $Li_2O$—$Al_2O_3$—$SiO_2$ transparent crystallized glass of this invention is suitable for use as a material of a front window or an inspection window of a combustion apparatus such as a room heater, a heating furnace, and an annealing furnace.

What is claimed is:

1. An $Li_2O$—$Al_2O_3$—$SiO_2$ transparent crystallized glass with β-quartz solid solution precipitated as main crystals, wherein the $Li^+$ concentration at a distance of 50 nm from the surface of the glass is at most 8/10 of the $Li^+$ concentration at a distance of 2000 nm from the surface of the glass, wherein said $Li_2O$—$Al_2O_3$—$SiO_2$ transparent crystallized glass further contains $Na_2O$, the $Na^+$ concentration at a distance of 50 nm from the surface thereof is at least twice the $Na^+$ concentration at a distance of 2000 nm from the surface of the glass, wherein said $Li_2O$—$Al_2O_3$—$SiO_2$ transparent crystallized glass further contains $K_2O$, the $K^+$ concentration at a distance of 50 nm from the surface thereof is at least one and a half times the $K^+$ concentration at a distance of 2000 nm from the surface of the glass.

2. An $Li_2O$—$Al_2O_3$—$SiO_2$ transparent crystallized glass as claimed in claim 1, wherein the distance between the surface of said $Li_2O$—$Al_2O_3$—$SiO_2$ transparent crystallized glass and a position at which said $Li^+$ concentration ratio reaches 0.95 is 70 nm or more.

3. An $Li_2O$—$Al_2O_3$—$SiO_2$ transparent crystallized glass as claimed in claim 1, wherein said $Li_2O$—$Al_2O_3$—$SiO_2$ transparent crystallized glass is used for a window of a combustion apparatus.

* * * * *